May 8, 1928. 1,668,554
F. ERNSTEIN
ASYNCHRONOUS POLYPHASE ELECTRIC MOTOR
Filed May 28, 1923 3 Sheets-Sheet 2
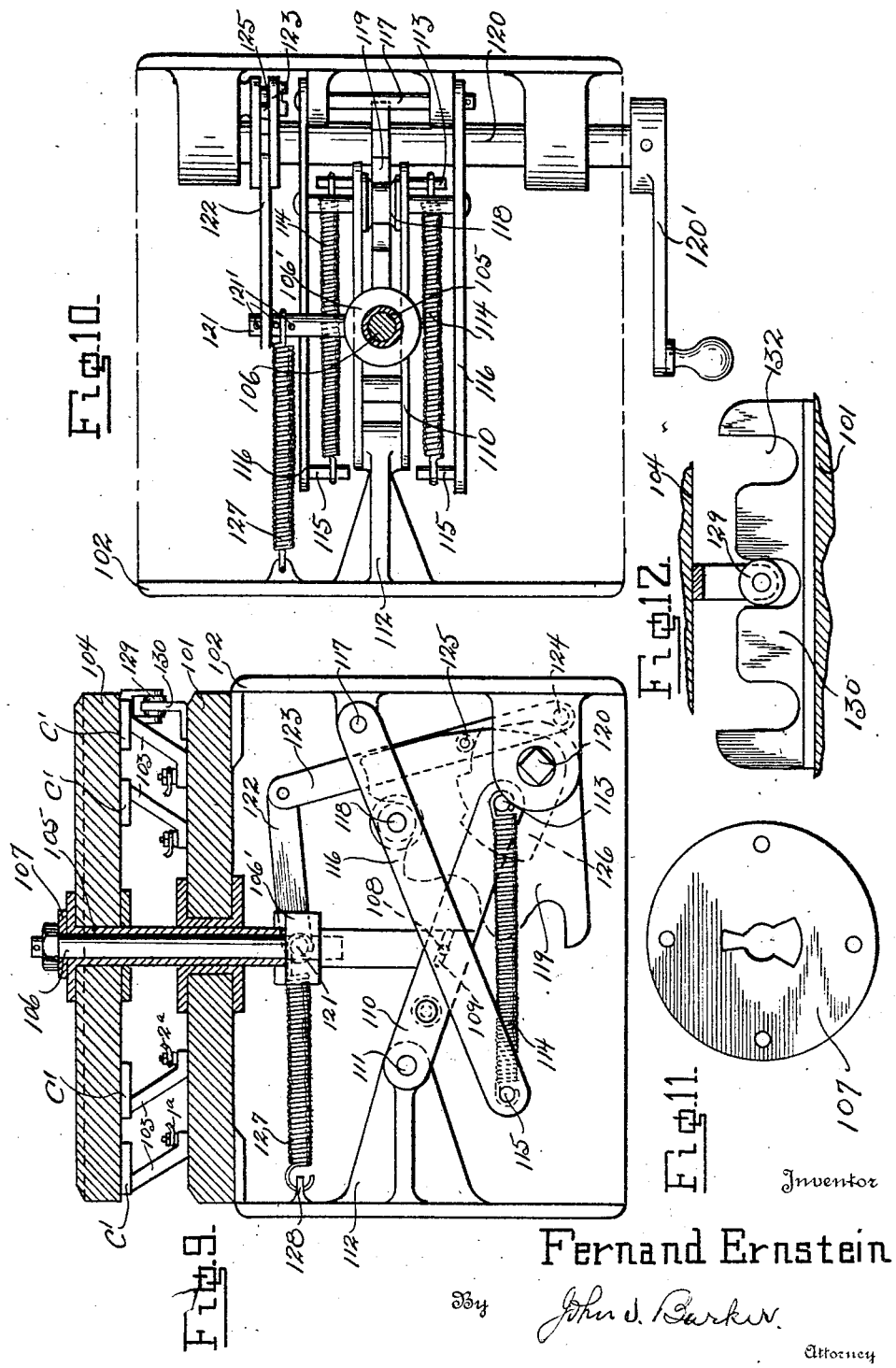
Inventor
Fernand Ernstein
By John J. Barker
Attorney

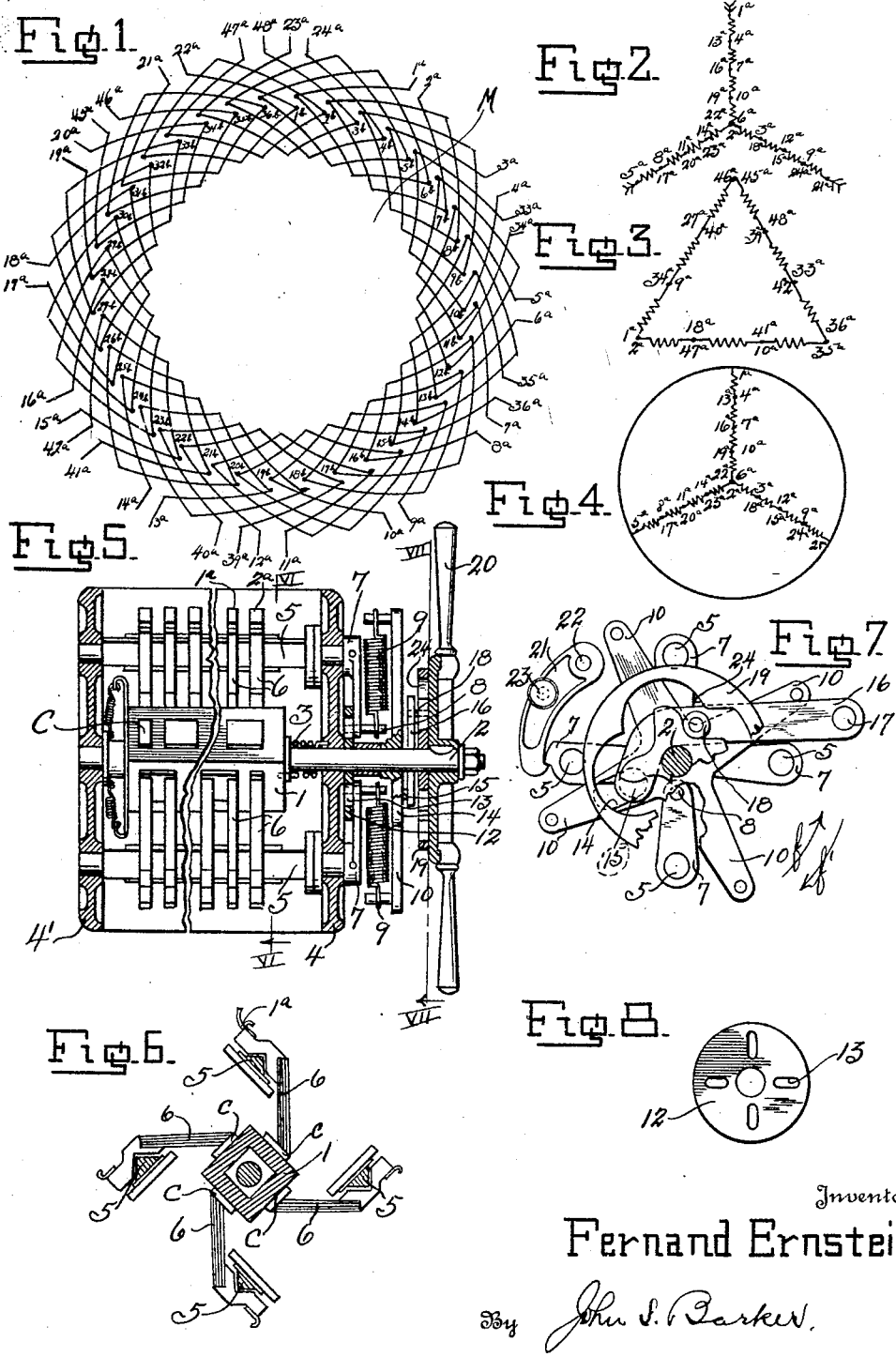

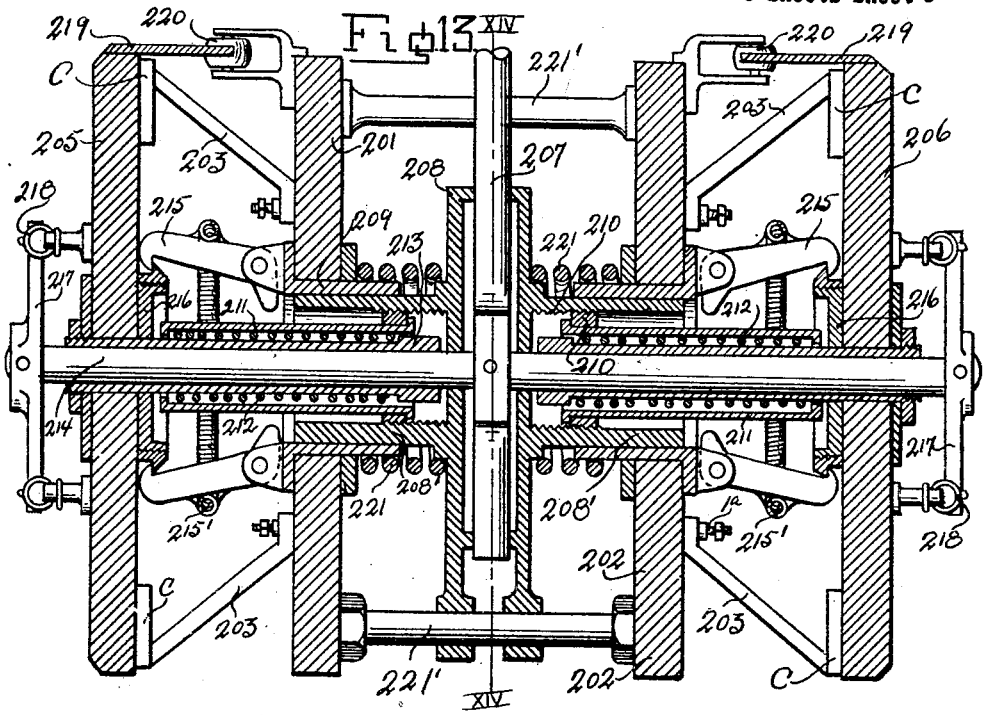
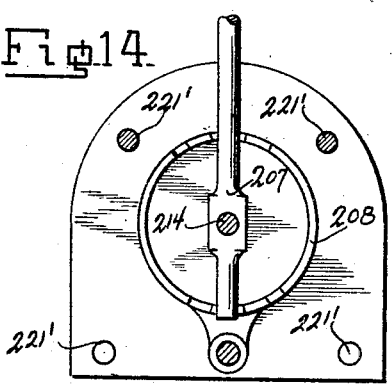
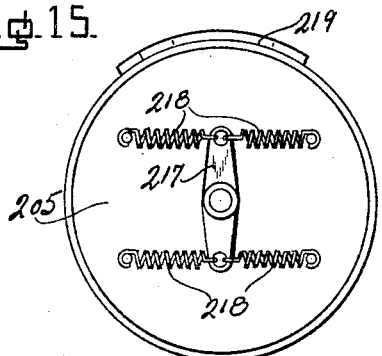
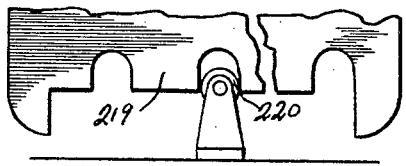
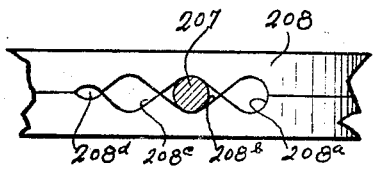

Patented May 8, 1928.

1,668,554

UNITED STATES PATENT OFFICE.

FERNAND ERNSTEIN, OF ROUBAIX, FRANCE.

ASYNCHRONOUS POLYPHASE ELECTRIC MOTOR.

Application filed May 28, 1923, Serial No. 642,139, and in France January 5, 1922.

The object of the present invention is to provide an asynchronous motor with means for operating it efficiently at two or more speeds.

Another object is to provide a novel switch construction suitable to accomplish the necessary connections.

In the drawings—

Figure 1 is a winding diagram for the stator of a 3 phase motor for 8, 6 and 4 poles and three corresponding speeds.

Figs. 2, 3 and 4 show the connections of this winding for 8, 6 and 4 poles, respectively.

Fig. 5 is a longitudinal section along the axis showing the assembly of the switch.

Fig. 6 is a section on VI—VI of Fig. 5.

Fig. 7 is a section on VII—VII of Fig. 5, with certain elements omitted for greater clearness.

Fig. 8 is a view of the washer connecting the handles of the brush shafts together.

Fig. 9 is a longitudinal axial section of the assembly of the modified switch.

Fig. 10 is an end view of the interior of the same.

Fig. 11 is a plan view of the washer which permits a simple mounting of the upper plate.

Fig. 12 is a view of the disposition of the safety member for the roller and of the notched member which cooperates with it.

Fig. 13 is an axial longitudinal section of the assembled switch.

Fig. 14 is a section on XIV—XIV of Fig. 13.

Fig. 15 shows the disposition of the centering lever and of the top of the movable plates.

Fig. 16 shows the different positions of the lever 207 with regard to cups 208.

Fig. 17 shows the lock disposition.

It is well known that asynchronous motors generally operate at a single speed which is approximately that of synchronism with three-phase motors, and that it is possible to obtain two speeds, the ratio between them generally being two to one. In other cases, to obtain different speeds, it is necessary to form the stator circuit as two separate windings.

The present invention concerns an asynchronous motor having two or more speeds with the stator having a single winding, and a squirrel cage rotor.

The stator of the three-phase motor is wave-wound similarly to direct current motors, and the taps are taken off in such relation to each other that the circuits for varying the number of poles is determined by short-circuiting adjacent pairs of taps.

I prefer to have the polar distance in this wave-winding approximately that corresponding to the intermediate speed. The construction shown has 36 slots, but any number may be used, so long as the number of winding coils is a common multiple of the number of poles and 3. Care should be taken to have a proper power factor and freedom from secondary harmonics.

To attain the different combinations in a practical and economical manner, a controlling switch is used, as shown in Figs. 5 to 17, inclusive.

The stator M of the three-phase motor carries an imbricated winding similar to that of a direct current motor whose polar distance approximates that corresponding to the intermediate speed. This winding is represented in Fig. 1 for the hypothetical case of a motor which has 36 slots with coil sections $1^b$ to $36^b$. Any number of slots may be used; it is sufficient that the number of winding coils be a common multiple of the number of poles multiplied by 3. This selection must be made with care to obtain a motor which has a good power factor and is free from secondary harmonics. The ends of the sections are brought out in taps numbered $1^a$ to $24^a$, $33^a$ to $34^a$, $39^a$ to $42^a$ and $45^a$ to $48^a$.

Figs. 2, 3 and 4 give the combination to be made between the different section ends. The ends which are not connected otherwise by a switch must be short-circuited between two adjacent numbers, odd and even. Thus the ends $33^a$—$34^a$, $39^a$—$40^a$, $41^a$—$42^a$, $47^a$—$48^a$ are connected together in the case of Fig. 2.

The switch, Figs. 5 to 7, comprises brushes which may be raised from and let fall abruptly onto the faces of an intermittently rotated drum or plate. It will be understood that a drum and a plate are the two extreme cases of a right cone; and I hereafter refer to them as interchangeable. These brushes and corresponding contacts carried by the drum allow, by suitable manipulation of the handle, of obtaining the desired connections of the coils as mentioned above.

The square drum 1 having contacts C thereon is mounted loosely on the shaft 2, and is connected to it by means of a spring 3.

This assembly is carried by frames 4, 4', in which are also mounted the shafts 5. On these shafts 5 are keyed the friction brushes 6 analogous to motor brushes, which normally rest at their free ends respectively on one of the faces of the drum. At the end of frame 4, the shafts 5 each have a crank 7. These cranks are connected at pins 8 to springs 9 fastened to the ends of the arms of a rocker 10 mounted loosely on the shaft 2. This shaft 2 likewise carries a washer 12 (Fig. 8) having slots 13 into which penetrate the pins 8 in such manner as to connect the various cranks 7 together.

An opening 14 is provided in one of the arms of the rocker 10, and a stud 15 integral with a lever 16 engages in it.

This lever 16 pivots about a support 17 and carries another stud pin 18 whose head is guided in a cam groove 24 of suitable shape formed in a disc 19 integral with handwheel 20 keyed on shaft 2. A pawl 21 movable about an axis 22 and carrying a roller 23, at a distance from the shaft 2 slightly less than the length of an arm of rocker 10, locks one crank 7 of the brush shafts. Elastic stops are further provided to limit the movement of the latter.

The operation is as follows:

If the handwheel 20 is turned in the direction of the arrow $f$, the shaft 2 is engaged, the drum 1 being retained by the brushes 6 remains stationary, and the spring 3 is tensed. The form of the groove 24 is such that the lever 16 pivots about the support 17, engaging, when moved in the direction of the arrow $f'$, the rocker 10 by means of the stud 15. When the rocker 10 has moved a certain amount, the springs 9 are tensed and pull on crank 7 but as the pawl 21 locks one of them, they may only move at the instant that the end of one of the rocker-arms 10 strikes the roller 23 and forces it outward, thus permitting the rotation of the shafts 5 and in consequence the raising of the brushes. The drum 1, now no longer being retained by the latter, turns a quarter revolution under the action of the spring 3.

At this instant, the stud 15 is lowered by the action of the cam groove 24 upon stud 18 and the rocker as well as the cranks 7 and the pawl 21 return to their original position.

Figs. 9–12 show a second form of the switch.

This switch comprises a plate into which are fastened brushes receiving the different connections to be coupled and a movable plate carrying the contacts realizing the connections desired. This latter plate may be controlled at a distance by appropriate mechanical means; it is at first raised by levers and rods under the action of a cam, then it is subjected to a suitable movement of rotation and redescends at the desired plate to make the desired connections. This switch is a simple apparatus permitting obtaining an unlimited number of combinations, and may be applied particularly to three-speed motors.

At 101 is seen the lower plate which rests on the frame 102 and supports the flexible brushes 103 disposed in two concentric rows in the example given. The connections $1^a$, $2^a$ etc. to be coupled end at these brushes.

The upper plate 104 is movable and carries contacts $c'$ which, by connecting the brushes 103 together, establishes connections for the desired diagrams. It is mounted on two vertical shafts, 105 and 106, which traverse both plates 101 and 104. The first of these shafts, 105, is hollow and surrounds the second, 106, to which the plate 104 is directly connected by a washer 107 of proper form such as that shown in Fig. 11 to allow easy dismounting. The central shaft 106 carries at its lower portion two studs 108 which engage in slots 109 provided, respectively, in two levers 110 located on opposite sides of the shaft and pivoted at 111 on a bracket 112 integral with the frame 102, and are connected at 113, 113 to springs 114 fastened at their other ends, 115, to two other levers 116, 116. These levers 116 are connected to the frame 102 by a pivot 117 and carry a roller 118, supported on a shaft 130 arranged between and connecting the shafts 116 and which bears on the outer contour of a cam 119, which is actuated by means of the control shaft 120.

The tubular shaft 105 rests on a shoulder 106' of the central shaft 106 and is consequently raised with it. The shaft 105 has a finger 121 which is connected by a link 122 to a rocker 123 pivoted to the frame at a point 124. The rocker carries a roller 125 that is in contact with a cam 126 keyed to the control shaft 120. A coil spring 127 fastened at one of its ends to a ring 128 integral with the frame 102 actuates the finger 121 to which it is connected at its other end. Safety devices are provided beneath the plate 104 (see Fig. 12) between it and the plate 101, so that the descent of plate 104 may only occur at the proper time. Pins 121' retain the link 122 and spring 127 in place with reference to roller 129. This roller 129 is carried by the plate 104 and bears against the cam path 130, which is mounted on the lower plate 101, and is provided with notches 132 intended to receive the said roller 129 when the upper plate redescends upon arriving at the desired point.

The operation of this switch is as follows:

A connection other than that existing being desired, the shaft 120 is rotated in the proper direction by means of a handle or handwheel 120'.

Under the influence of this rotation, the cam 119 turns and its spurs raise the roller 118, which in turn moves the two levers 116. The latter pivot about 117 and pull, by means of the springs 114, the ends of the levers 110, which turn about the point 111. The latter, being connected by the slots 109 and the studs 108 with the central shaft 106, raise the plate 104. At this moment the cam 126, which likewise is subjected to the rotational movement of the shaft 120, acts on roller 125 and moves it if the movement is clockwise: the rocker 123 being connected to finger 121 by the link 122, pulls on the latter and rotates it as well as plate 104. This rotation is possible since the roller 129, at the moment of raising plate 104, leaves notch 132 in which it has been and is then displaced over the cam path 130 to redescend subsequently into the notch 132 into which it is to be brought.

In case of a counterclockwise rotation of the shaft 120, spring 127 pulls on finger 121 when roller 125 is lowered in contact with cam 126, so that the movement of the various elements is similar to that described previously, but occurs in the opposite direction.

Modifications of detail may be incorporated without departing from the general scope of this invention. In particular the two cams 119 and 126 may be eliminated, the ascending movement of the plate 104 then occurring by the raising of a lever and angular movement of this lever subsequently causing it to turn the said plate 104 on itself. In this case, likewise, the springs energetically retract the movable plate onto the fixed plate.

For a large number of contacts, the above construction makes the plate too large. Further, the number of contacts per row being high, the angular displacement must be small. A disposition with two plates of brushes gives a much greater flexibility, and such an arrangement is shown in Figs. 13 to 16.

The switch shown in these views comprises two stationary plates 201 and 202 having brushes 203 on which rest the contacts C fastened to the movable plates 205 and 206. At the middle of the central shaft 214 is fastened a lever 207 of appropriate form such as shown in Fig. 14. At proper points on shaft 214 are placed two cups 208 with hollow stems 208' concentric with the shaft 214 and sliding in two sleeves 209 fastened to the stationary plates 201 and 202. The cups 208 are retained against the plates by aid of springs 221, and may be separated longitudinally, but cannot turn.

The stems 208' have each an internal threaded portion 210 with which engage the nuts 210' slidable upon the shouldered tubes 211. Inside these tubes 211 are lodged two springs 212 which bear against the shouldered tubes 213, directly supported on the shaft 214. At the outer ends of the tubes 213 are fastened the movable plates 205 and 206 whose contacts C just rub against the brushes 203. The plates have a locking means comprising hooks 215 pivoted on plates 201 and 202 and engaging on the bowls 216 of the movable plates 205 and 206. These hooks 215 are retracted by tension springs 215' or the like.

The two plates 205 and 206 are connected to the central shaft 214 by means of the centering lever 217 at the ends of which are attached springs 218 disposed as shown in Fig. 15. Notches $208^a$, $208^b$, $208^c$ and $208^d$ are formed in the edges of discs 208 and serve to retain the lever 207 in different positions, as indicated in Fig. 16.

There are locking means provided for the movable plates formed by rollers 220 fastened on the stationary plates 201 and 202 and the notched plates 219 fastened on the movable plates 205 and 206. The assembly is presented in Fig. 17.

The operation of the switch is as follows:

The displacement of the lever 207 from one notch $208^a$—$208^d$ to another separates the bowls 208 and compresses the springs 221. The shaft 214 turns but the movable plates 205 and 206 being locked by hooks 215 and the pawl mechanism 219, the springs 218 tend to act; some tense, others expand. During the longitudinal displacement the bowls 208 strike against the shouldered tubes 213 which compress the springs 212, the tubes 211 surrounding the springs being held against the movable plates 205 and 206 by the springs. At the end of their travel the hollow stems carried by the bowls 208 strike against the tails of hooks 215 and raise the latter away from engagement with 216. The movable plates 205 and 206 are now liberated and are forced outward by the compressed springs 212, and an abrupt rupture of the contacts occurs. The springs 218 impress the desired rotation on the plates 205 and 206. The lock mechanism 219 has now just presented another notch in front of the roller 220. The lever 207 has just placed itself in another notch of the bowls 208. The latter, being retracted by the springs 221, again assume their original position. The plates are retracted by springs 212, the hooks reassume their places and the whole returns to the original position.

The bowls 216 avoid wear on the contacts 203 and C.

This disposition may be doubled if one of the discs serves as a socket plate and the coupler has a single plate.

The lever 207 may be replaced by a plate and the shaft 214 controlled from the exterior by means of a lever, handle or gear.

These switches may further serve to obtain all combinations desired as: star-delta, series-parallel, etc.

What I claim is:

1. A switch adapted for use in electric motors comprising a series of contact brushes with which the terminals of electric conductors are connected, conducting pieces upon which the said brushes bear, the conducting pieces and contact brushes being arranged in a circular series, means for separating the contacts and brushes by relatively moving them apart, other means for causing relative rotation of these parts after they have been separated to set them in new relations, and means for restoring the contacts by bringing the said parts together after they have been rotatively moved.

2. A switch adapted for use in electric motors comprising a series of contact brushes with which the terminals of electric conductors are connected, conducting pieces upon which the said brushes bear, the conducting pieces and contact brushes being arranged in a circular series, means for separating the contacts and brushes by relatively moving them apart, other means for causing relative rotation of these parts after they have been separated to set them in new relations, means for restoring the contacts by bringing the said parts together, and means for positively preventing restoration of said parts until the desired rotative position for engagement between them shall have been attained.

3. A switch such as described in claim 1, including a common actuator that controls the movements of the contacts and brushes and causes them to operate in sequence, as stated.

4. A switch comprising a shaft, a support loose on said shaft, contacts on and insulated from said support, a frame supporting said shaft, brushes mounted on and insulated from said frame, said brushes bearing against said support, means for imparting a rotative movement to the shaft, and means between the shaft and support, automatically operating, through the rotative movement of the shaft, first to move apart the brushes and contacts, then to shift one relative to the other to establish new relations between them, and finally to bring them together.

5. An electric switch, comprising brushes arranged in a circular series, contacts upon which the brushes bear and which serve to electrically unite the brushes in determined relations, a movable plate carrying the contacts, a cam-operated mechanism for first moving the plate to separate the contacts and brushes, other mechanism operating when such separation has been effected for rotating the plate and means for then restoring the connections between the brushes and contacts in the new relations to which they have been set.

6. In an electric switch by which different electric circuits may be established, a frame, brushes on said frame, contacts on which the brushes bear supported so as to be movable relative to the brushes, means to hold the said parts together in working relationship with the electric contacts closed, operating means for applying stress to cause relative movement between the contacts and brushes to separate them and open the electric circuits and then to shift them so new circuit relations may be established, and means associated with the said operating means to release the circuit-closing parts from the said holding means after the operating means have been moved to apply stress as aforesaid.

7. A switch comprising a frame, a shaft rotatable in the frame, a plate on said frame, contacts on said plate, brushes on the frame resting against said contacts, a pin on said shaft, a crank shaft, a cam on said crank shaft, a lever arm bearing against said cam, and a link connection between said pin and said lever arm.

8. A switch comprising a frame, a rotatable shaft, a stationary plate on said frame, brushes on said stationary plate, a movable plate on said shaft, contacts on said movable plate, a non-rotatable shaft within said first shaft, an operating shaft rotatable in said frame, a raising cam on said operating shaft, spring-held links resting against said raising cam and serving to raise said shafts, and a lever actuated by said rotating cam to rotate said rotatable shaft.

9. A switch comprising a frame, a rotatable shaft, a stationary plate on said frame, brushes on said stationary plate, a movable plate on said shaft, contacts on said movable plate, a non-rotatable shaft within said first shaft, an operating shaft rotatable in said frame, a raising cam on said operating shaft, spring-held links resting against said raising cam and serving to raise said shafts, a lever actuated by said rotating cam to rotate said rotatable shaft, and a locking device to secure said movable plate in a selected operative position.

FERNAND ERNSTEIN.